(12) United States Patent
Ito

(10) Patent No.: US 9,614,985 B2
(45) Date of Patent: Apr. 4, 2017

(54) INFORMATION PROCESSING APPARATUS, METHOD OF CONTROLLING THE SAME FOR COOPERATIVE OPERATION OF PROGRAMS EXECUTED ON PLATFORMS, AND STORAGE MEDIUM

(71) Applicant: CANON KABUSHIKI KAISHA, Tokyo (JP)

(72) Inventor: Daisuke Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/735,585

(22) Filed: Jun. 10, 2015

(65) Prior Publication Data

US 2015/0365550 A1 Dec. 17, 2015

(30) Foreign Application Priority Data

Jun. 13, 2014 (JP) ................................. 2014-122745

(51) Int. Cl.
*G06F 13/00* (2006.01)
*H04N 1/00* (2006.01)

(52) U.S. Cl.
CPC . *H04N 1/00244* (2013.01); *H04N 2201/0046* (2013.01)

(58) Field of Classification Search
CPC .................................. G06F 9/541; G06F 9/547

USPC .......................................... 719/311, 328, 330
See application file for complete search history.

(56) References Cited

U.S. PATENT DOCUMENTS

| 8,151,281 | B2 * | 4/2012 | Reed | G06F 9/44505 |
| | | | | 719/328 |
| 8,285,880 | B2 * | 10/2012 | Ye | H04L 29/06 |
| | | | | 370/395.5 |
| 8,701,129 | B2 * | 4/2014 | Nobuoka | G06F 9/541 |
| | | | | 719/328 |

FOREIGN PATENT DOCUMENTS

JP 2013-137612 A 7/2013

\* cited by examiner

*Primary Examiner* — Andy Ho
(74) *Attorney, Agent, or Firm* — Carter, DeLuca, Farrell & Schmidt, LLP

(57) ABSTRACT

Provided are an information processing apparatus including a plurality of different software platforms and a method of controlling the same, in which service information provided by first software for operating on a first software platform of the plurality of software platforms is transformed into information that is able to be used by a second software platform of the plurality of software platforms and is registered, and second software for operating on the second software platform calls the registered information, the information is transformed into service information provided by the first software so that the first software is able to provide a service corresponding to the service information.

9 Claims, 8 Drawing Sheets

FIG. 6

| 600 UUID | 601 Type | 602 OSGi Service | 603 URL |
|---|---|---|---|
| 234f9922-c33b... | Print | com.abc.PrintService | http://localhost/com/abc/printservice |
| 654a1277-d44a... | Error_recovery | com.abc.EerrorRecoveryService | http://localhost/com/abc/errorrecoveryservice |
| ... | ... | ... | ... |

INFORMATION PROCESSING APPARATUS, METHOD OF CONTROLLING THE SAME FOR COOPERATIVE OPERATION OF PROGRAMS EXECUTED ON PLATFORMS, AND STORAGE MEDIUM

BACKGROUND OF THE INVENTION

Field of the Invention

The present invention relates to an information processing apparatus, a method of controlling the same, and a storage medium.

Description of the Related Art

In recent years, more mobile phones and the like are provided with an arrangement in which applications and services mutually and cooperatively operate. Devices, such as a multi-function peripheral (MFP) and a printer apparatus, also include a plurality of applications and services in some cases. There is a growing demand for an arrangement in which the plurality of applications and services included in the MFP and the applications and the services included in the mobile phones mutually and cooperatively operate.

Examples of a conventional arrangement in which applications and services cooperatively operate include Intents incorporated into Android (registered trademark) and Web Intents incorporated into part of Web browsers. There is also a technique for specifying a service based on a manifest file and Intents (see Japanese Patent Laid-Open No. 2013-137612).

The applications and the services can mutually and cooperatively operate in the conventional technique described in Japanese Patent Laid-Open No. 2013-137612. However, in order for the applications and the services to mutually and cooperatively operate in the conventional technique, it is essential that the applications and the services are on the same software platform and that the same cooperative arrangement is employed. Therefore, there is a case in which applications and services are executed in an information processing apparatus including a plurality of platforms and a plurality of cooperative arrangements, and such a case is not taken into account. Thus, the conventional technique is not sufficient for cooperative operation across different platforms and cooperative arrangements.

SUMMARY OF THE INVENTION

An aspect of the present invention is to eliminate the above-mentioned problems which are found in the conventional technology.

A feature of the present invention is to provide a technique that is able to provide a plurality of software platforms for cooperative operation of programs executed on the platforms without a barrier.

According to a first aspect of the present invention, there is provided an information processing apparatus including a plurality of software platforms, the apparatus comprising: a transforming unit that transforms service information provided by first software for operating on a first software platform of the plurality of software platforms into information that is able to be used by a second software platform of the plurality of software platforms, and registers the information; and a service providing unit that transforms the information transformed and registered by the transforming unit, in which the second software for operating on the second software platform calls, into service information provided by the first software, and causes the first software to provide a service corresponding to the service information.

According to a second aspect of the present invention, there is provided an information processing apparatus including a plurality of software platforms, the apparatus comprising: a first service management unit that registers and manages service information provided by software for operating on a first software platform of the plurality of software platforms; a service transforming unit that transforms the service information registered in the first service management unit into information that can be handled by a second software platform of the plurality of software platforms; a registration unit that associates and registers the service information and the information; and a second service management unit that registers and manages the information transformed by the service transforming unit in the second software platform, wherein in response to a call of a service from software for operating on the second software platform, the second service management unit obtains the information corresponding to the service from the registration unit, and the first service management unit obtains the service information corresponding to the information to activate corresponding software for operating on the first software platform.

According to a third aspect of the present invention, there is provided a method of controlling an information processing apparatus including a plurality of software platforms, the method comprising: transforming service information provided by first software for operating on a first software platform of the plurality of software platforms into information that is able to be used by a second software platform of the plurality of software platforms and registering the information; and transforming the information transformed and registered in the transforming, in which the second software for operating on the second software platform calls, into service information provided by the first software, and causing the first software to provide a service corresponding to the service information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing an example of information registered in a transforming data table according to an embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
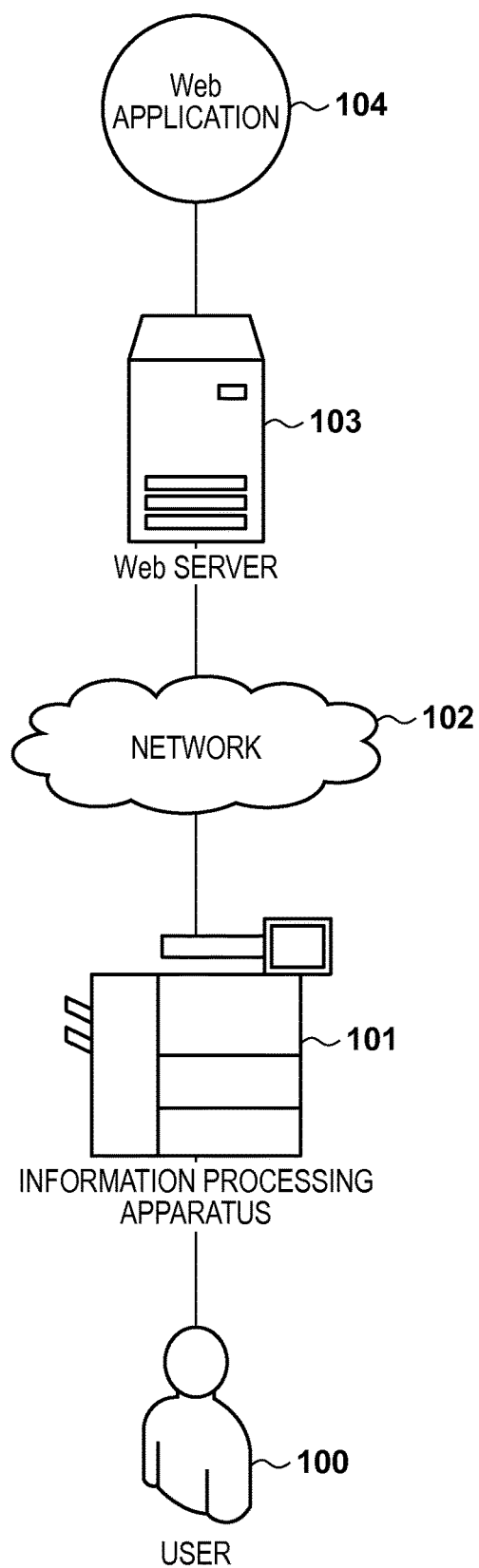
FIG. 1 is a diagram showing an example of a configuration of an entire system according to an embodiment of the present invention.

FIG. 1 is a diagram showing an example of a configuration of an entire system according to an embodiment of the present invention.

The system according to the present embodiment includes an information processing apparatus 101, a Web server 103 connected to the information processing apparatus 101 through a network 102, and a Web application 104 operated on the Web server 103.

A user 100 is able to use the Web application 104 via a user interface unit of the information processing apparatus 101. Although an example of the information processing apparatus 101 is a multi-function peripheral (multi-function processing apparatus: MFP) including a scanner unit and a printer unit in the description of this embodiment, the information processing apparatus of the present invention is not limited to the MFP or the printer.

Figure 2:
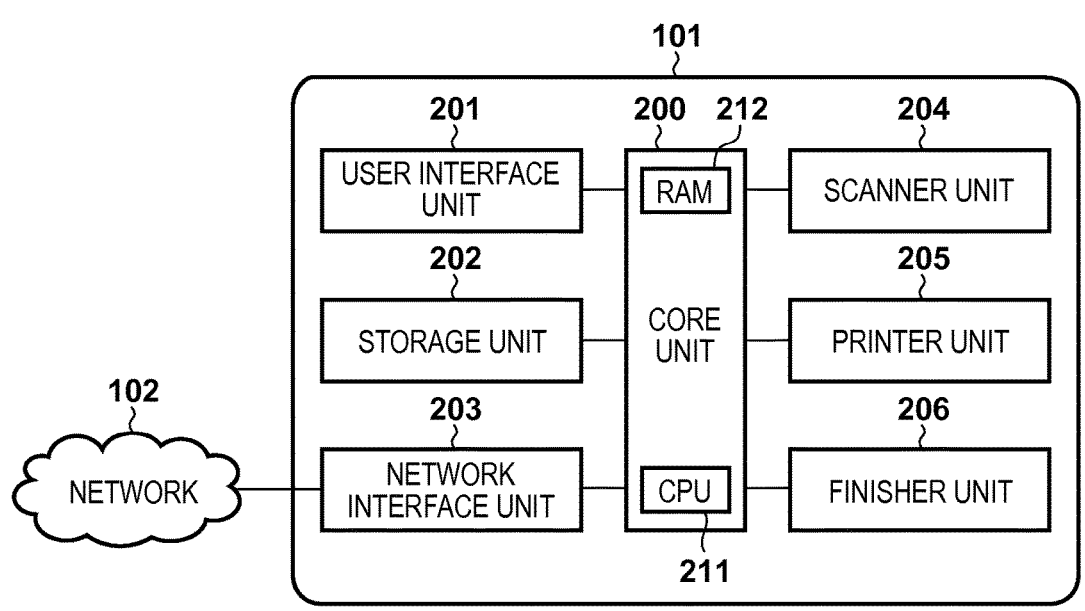
FIG. 2 is a block diagram for describing a hardware configuration of an information processing apparatus according to the embodiment.

FIG. 2 is a block diagram for describing a hardware configuration of the information processing apparatus 101 according to the embodiment.

The information processing apparatus 101 includes a core unit 200, a user interface unit 201 connected to the core unit 200, a storage unit 202, a network interface unit 203, a scanner unit 204, a printer unit 205, and a finisher unit 206. The core unit 200 includes a CPU 211, a RAM 212 for providing a work area to the CPU 211 and providing an deploying area of programs stored in the storage unit 202, and the like and controls operation of the information processing apparatus 101.

Figure 3:
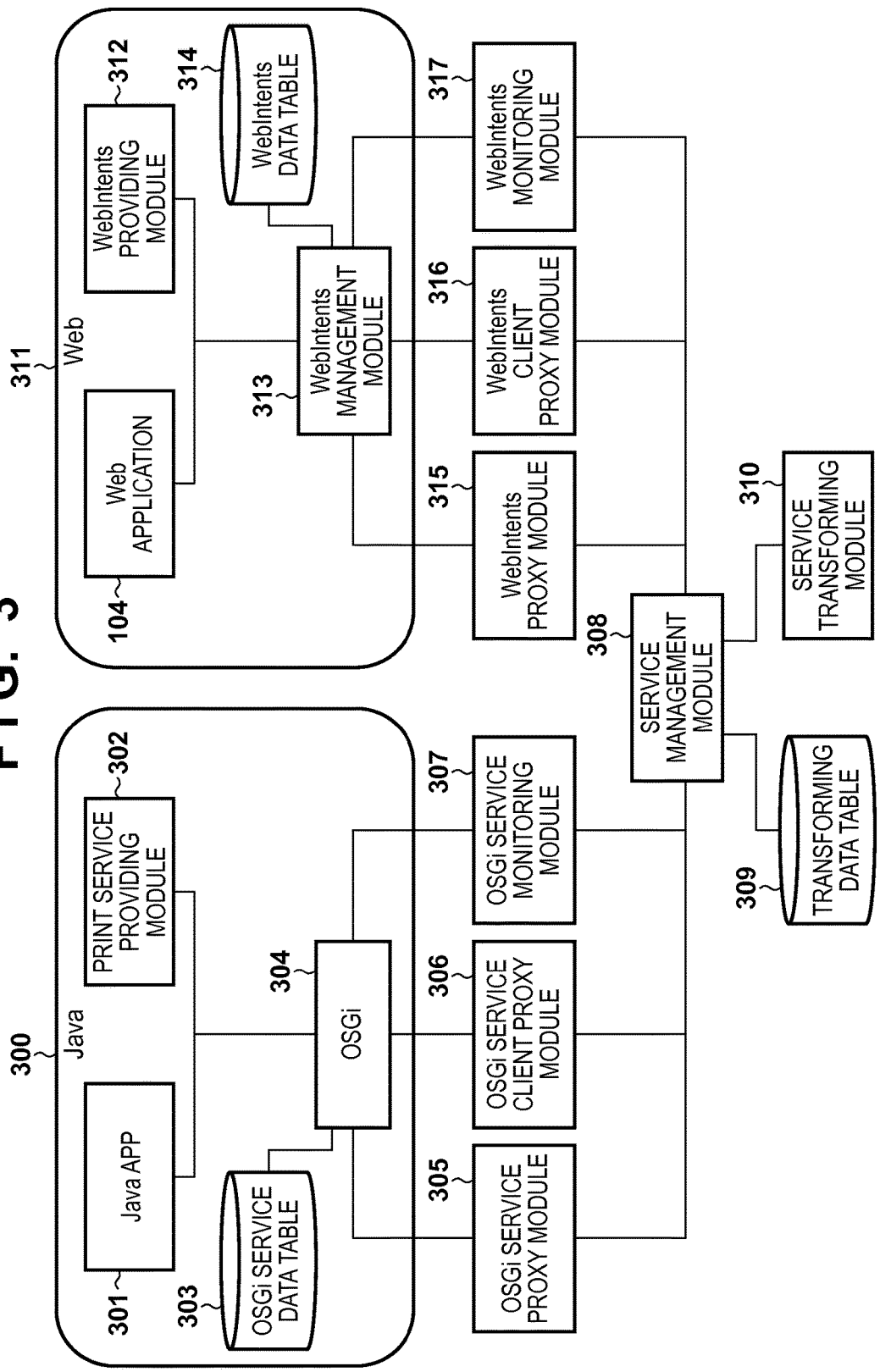
FIG. 3 is a block diagram for describing a software configuration of the information processing apparatus according to the embodiment.

The user interface unit 201 can receive operation by the user 100 and can display, to the user 100, information of the Web application 104 and a print service providing module 302 (FIG. 3). The storage unit 202 stores software, various data, and the like of the information processing apparatus 101. The network interface unit 203 provides a communication function of connecting the information processing apparatus 101 and the network 102. The software of the information processing apparatus 101 controls the scanner unit 204, the printer unit 205, and the finisher unit 206. This enables execution of a copy process of reading an original with the scanner unit 204 and printing the original with the printer unit 205 according to image data obtained by reading the original, a print process of executing and printing a print job received through the network 102, and the like. The constituent elements shown in FIG. 2 are just examples of hardware elements, and the present invention is not limited to the configuration described above.

FIG. 3 is a block diagram for describing a software configuration of the information processing apparatus 101 according to the present embodiment. The software is stored in the storage unit 202. The software is deployed in the RAM 212 at the execution and is executed under the control of the CPU 211.

The information processing apparatus 101 is an information processing apparatus provided with a plurality of different software platforms, and the software platforms are roughly divided into areas of java (registered trademark) 300 and Web 311.

The area of java 300 includes a java module group, and the main module is OSGi (Open Services Gateway initiative) 304. The OSGi 304 operates according to requests from modules that provide various OSGi services, such as a print service provided by the print service providing module 302. Here, the services can be registered or deleted in an OSGi service data table 303, for example. A service registered in the OSGi service data table 303 can be returned according to a service acquisition request from an application such as a Java application (Java app) 301. For example, the java app 301 can use a print service provided by the print service providing module 302 through the OSGi 304.

The java 300 further includes three modules serving as proxies for handling services outside of the area of the java 300 in the area of the java 300. The first module is an OSGi service proxy module 305. The OSGi service proxy module 305 is a module serving as a proxy for registering, in the OSGi 304, services provided by the OSGi service proxy module 305 among the services outside of the area of the java 300. The OSGi service proxy module 305 can register services of a service providing module in the area of the Web 311 through a service management module 308.

The second module is an OSGi service client proxy module 306. The OSGi service client proxy module 306 is a module that executes, by proxy, a request of a client using a service outside of the area of the Java 300. The OSGi service client proxy module 306 allows a client module in the area of the Web 311 to acquire and use the service to be used, through the service management module 308.

The third module is an OSGi service monitoring module 307. The OSGi service monitoring module 307 can cooperate with the OSGi 304 to issue an event such as a registration or deletion of a service and a request of a service. The OSGi service monitoring module 307 can cooperate with the service management module 308 to issue various events to the modules in the area of the Web 311.

The area of the Web 311 includes the Web application 104 downloaded from the Web server 103 as well as modules that handle Web content, and the main module is a WebIntents management module 313. The WebIntents management module 313 registers or deletes services in a WebIntents data table 314 according to requests from a WebIntents providing module 312 as well as various modules that provide services called WebIntents. The WebIntents management module 313 can return a service registered in the WebIntents data table 314 according to a service acquisition request from the Web application 104 or the like. As a result, the Web application 104 can use the service provided by the WebIntents providing module 312 through the WebIntents management module 313. The WebIntents provide an arrangement for connecting Web applications, and Intent is basically a general action, such as Edit, View, and Share, and parameters related to the action are associated.

As in the Java 300, the Web 311 includes three modules serving as proxies for handling services outside of the area of the Web 311 in the area of the Web 311. The three modules are a WebIntents proxy module 315, a WebIntents client proxy module 316, and a WebIntents monitoring module 317. These are modules with functions equivalent to the OSGi service proxy module 305, the OSGi service client proxy module 306, and the OSGi service monitoring module 307.

The service management module 308 can cooperate with the OSGi service monitoring module 307 and the WebIntents monitoring module 317 to detect the OSGi services and the WebIntents registered in the OSGi 304 and the WebIntents management module 313, respectively. Related information can also be acquired at the timing of the detection. The service management module 308 checks the acquired related information to determine whether the OSGi services and the WebIntents are registered in a transforming data table 309. If the OSGi services and the WebIntents are not registered in the transforming data table 309, the service management module 308 uses a service transforming module 310 to transform the names of the OSGi services into the WebIntents and the names of the WebIntents into the OSGi services. The service management module 308 then registers the information in the transforming data table 309 based on the transformed names.

The service management module 308 can also use the arrangement to detect deleted OSGi services and WebIntents from the OSGi 304 and the WebIntents management module 313, respectively, and delete the OSGi services and the WebIntents from the transforming data table 309.

Through the modules, the print service provided by the print service providing module 302 can also be registered in the WebIntents management module 313 as if the print service is WebIntents, at the timing of the registration of the print service in the OSGi 304. The Web application 104 can use the print service provided by the print service providing module 302 to use the WebIntents through the WebIntents management module 313.

Figure 4:
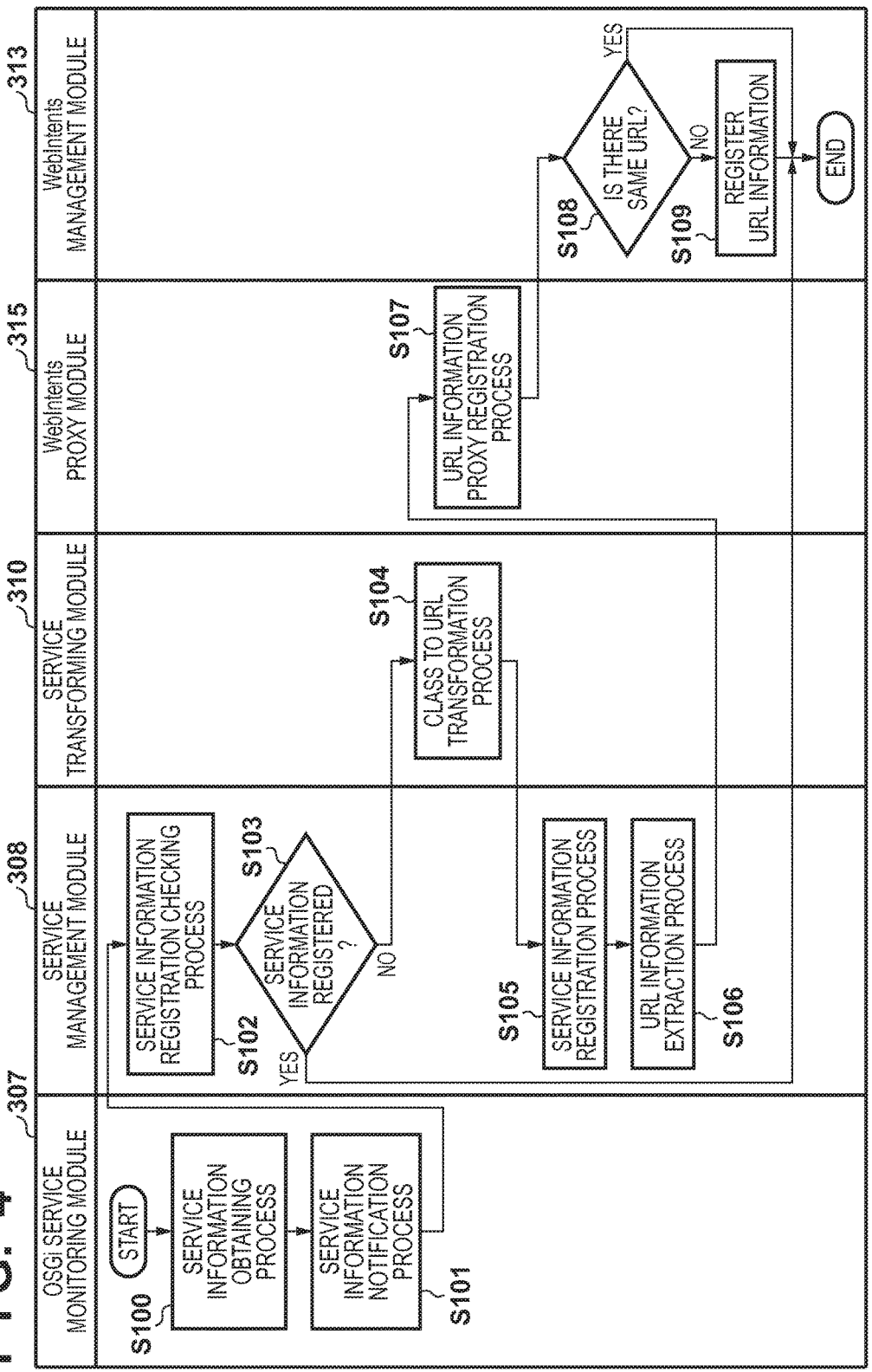
FIG. 4 is a sequence diagram for describing a process of registering a print service (OSGi service) registered by a print service providing module as WebIntents managed by a WebIntents management module according to the embodiment.

FIG. 4 is a sequence diagram for describing a process of registering a print service (OSGi service) registered by the print service providing module 302 as WebIntents managed by the WebIntents management module 313 according to the present embodiment.

The process is started when the print service providing module 302 registers the OSGi service (print service) in the OSGi 304, and the OSGi service monitoring module 307 detects the registration of the OSGi service (print service).

In step 5100, the OSGi service monitoring module 307 first obtains the registered OSGi service information from the OSGi 304 and proceeds to step S101. In step S101, the OSGi service monitoring module 307 notifies the service management module 308 of the acquired OSGi service information.

As a result, the service management module 308 executes a checking process of checking whether the obtained OSGi service information is registered in the transforming data table 309 in step S102 and proceeds to step S103. In step S103, if the service management module 308 determines that the obtained OSGi service information is registered in the transforming data table 309, the service management module 308 ends the process because there is no need to newly register information.

On the other hand, if the service management module 308 determines in step S103 that the obtained OSGi service information is not registered, the service management module 308 notifies the service transforming module 310 of the OSGi service information.

As a result, the service transforming module 310 extracts class information from the received OSGi service information, transforms the class information into URL information according to the class information, and notifies the service management module 308 of the URL information in step S104.

As a result, the process proceeds to step S105, and the service management module 308 registers, in the transforming data table 309, the OSGi service information received from the OSGi service monitoring module 307 and the URL information obtained from the service transforming module 310 and proceeds to step S106. In step S106, the service management module 308 extracts the URL information from the information registered in the transforming data table 309 in step S105 and notifies the WebIntents proxy module 315 of the URL information.

As a result, the WebIntents proxy module 315 registers, by proxy, the notified URL information as WebIntents in the WebIntents management module 313 in step S107.

As a result, the process proceeds to S108, and the WebIntents management module 313 determines whether the received URL information is in the WebIntents data table 314. If the WebIntents management module 313 determines that the received URL information is in the WebIntents data table 314, the WebIntents management module 313 ends the process. If the WebIntents management module 313 determines that the received URL information is not in the WebIntents data table 314, the WebIntents management module 313 proceeds to step S109. In step S109, the WebIntents management module 313 registers the URL information in the WebIntents data table 314 and ends the process.

When the print service providing module 302 registers the print service (OSGi service) through the process described above, the print service providing module 302 investigates whether the service is registered in the transforming data table 309. If the service is not registered, the print service providing module 302 extracts class information from the OSGi service information, transforms the class information into URL information according to the class information, and registers the URL information as well as the OSGi service information in the transforming data table 309. If the URL information is not in the WebIntents data table 314, the print service providing module 302 further registers the URL information in the WebIntents data table 314. In this way, when the print service providing module 302 registers the print service (OSGi service), the URL information to be used in the print service is registered as WebIntents.

Figure 5:
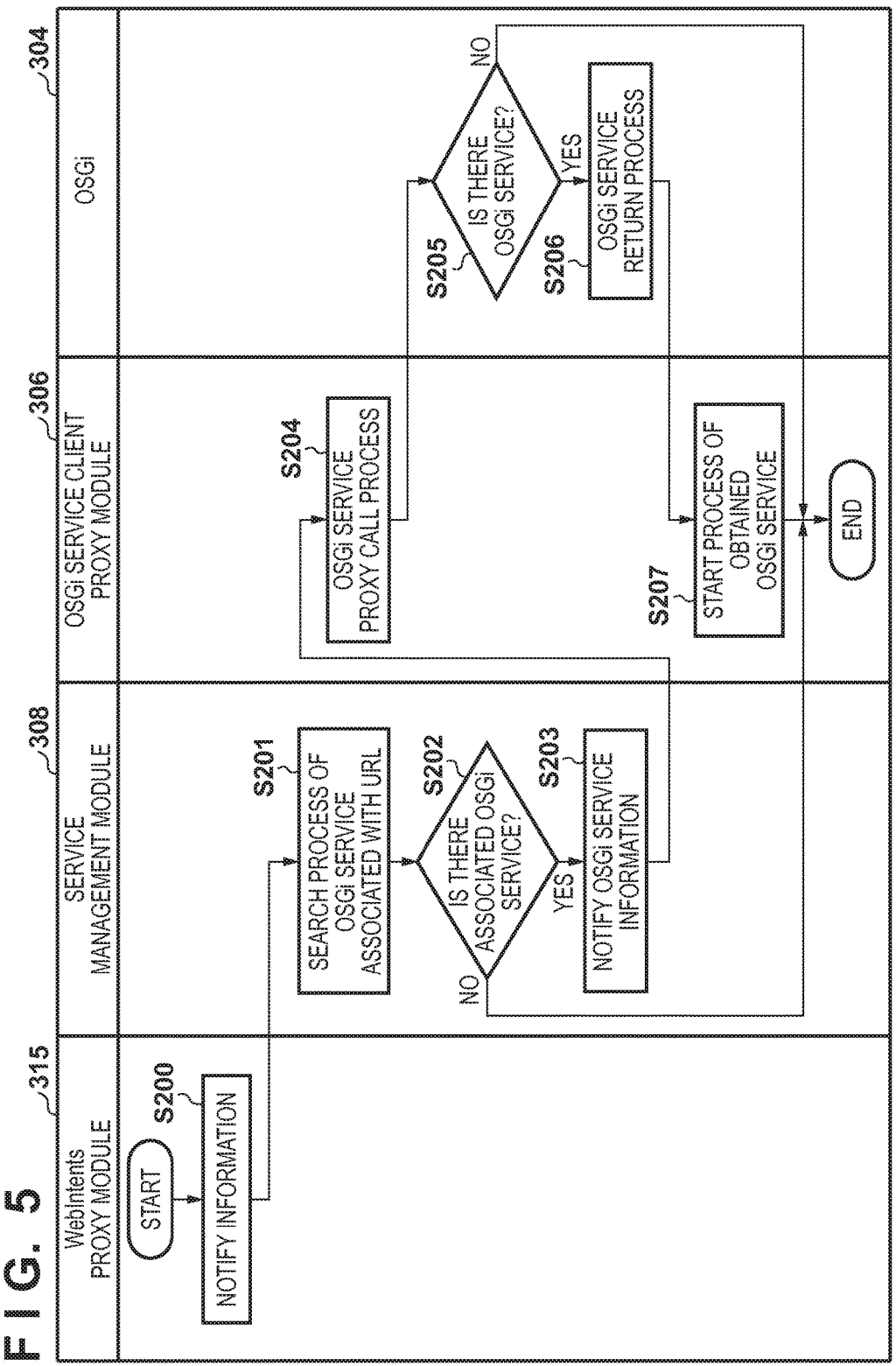
FIG. 5 is a sequence diagram for describing a flow of a process in which a Web application calls WebIntents registered in the WebIntents management module to thereby call a print service providing module according to the embodiment.

FIG. 5 is a sequence diagram for describing a flow of a process in which the Web application 104 calls the WebIntents registered in the WebIntents management module 313 to thereby call the print service providing module 302 according to the present embodiment.

In the process, the Web application 104 transmits the URL information registered in the WebIntents data table 314 and data (for example, document data) to be transferred to the WebIntents to the WebIntents management module 313, in order to call the WebIntents registered in the WebIntents management module 313. The process is started when the WebIntents proxy module 315 associated with the URL information is called.

In step S200, the WebIntents proxy module 315 notifies the service management module 308 of information including the URL information and the data.

As a result, the service management module 308 in step S201 executes a search process of investigating whether the OSGi service associated with the URL information is registered in the transforming data table 309 based on the URL information in the notified information. The process proceeds to step S202, and if the service management module 308 determines that the OSGi service associated with the URL information is not registered in the transforming data table 309, the service management module 308 ends the process. On the other hand, if the service management module 308 determines that the OSGi service is registered, the service management module 308 advances the process to step S203. In step S203, the service management module 308 notifies the OSGi service client proxy module 306 of the information along with the data including the OSGi service information associated with the URL information.

As a result, the OSGi service client proxy module 306 in step S204 executes a proxy call process of the OSGi service for the OSGi 304 based on the information received from the service management module 308.

As a result, the process proceeds to step S205, and the OSGi 304 determines whether the called OSGi service is in the OSGi service data table 303. If the OSGi 304 determines that the OSGi service is not in the OSGi service data table 303, the OSGi 304 ends the process. On the other hand, if the OSGi 304 determines that the OSGi service is in the OSGi service data table 303, the process proceeds to step S206, and the OSGi 304 returns the OSGi service provided by the print service providing module 302 to the OSGi service client proxy module 306.

As a result, the OSGi service client proxy module 306 in step S207 notifies the OSGi service received from the OSGi 304 of the data and executes a service start process.

As a result, when a print service including document data is requested from the Web application 104, the data including the print service information associated with the URL information of the print service is transmitted to the OSGi service client proxy module 306. As a result, the OSGi service client proxy module 306 can activate the print service providing module 302 to execute the print service. In this way, the software managed by the OSGi can be executed in response to the service request from the Web application 104 to execute the service request.

FIG. 6 is a diagram showing an example of the information registered in the transforming data table 309 according to the embodiment.

Specific constituent elements of the registered information include UUID 600, Type 601, OSGi Service Name 602, and URL 603. The UUID 600 indicates unique IDs (identifiers) of the information registered in the transforming data table 309. The Type 601 indicates types (kinds) of services registered in the transforming data table 309. For example, a print service is indicated by "Print", and a recovery service at an occurrence of an error is indicated by "Error_recovery".

The OSGi Service Name 602 indicates a name of the OSGi service that can be handled by the OSGi 304. The OSGi Service Name 602 indicates the same name as the name used when the print service providing module 302 registers the service in the OSGi 304.

The URL 603 indicates URL that can be handled by the WebIntents management module 313. The URL is the same as the URL used when the WebIntents providing module 312 registers the service in the WebIntents management module 313. In this way, the name of the OSGi services that can be handled by the OSGi 304 and the URL that can be handled by the Web application are associated and registered in the transforming data table 309.

A process of transforming the OSGi Service Name 602 to generate the URL 603 will be described. For example, as shown in FIG. 6, "/" is allocated to "." for the class name including the package, capital letters are lower-cased, and "http://localhost/" is added to the top. In this way, transformation to unique URL information is possible. To transform the URL 603 into the OSGi Service Name 602, "http://localhost/" can be removed from the top of the URL 603 to transform the URL 603 into the OSGi Service Name 602 in a similar manner.

Figure 7:
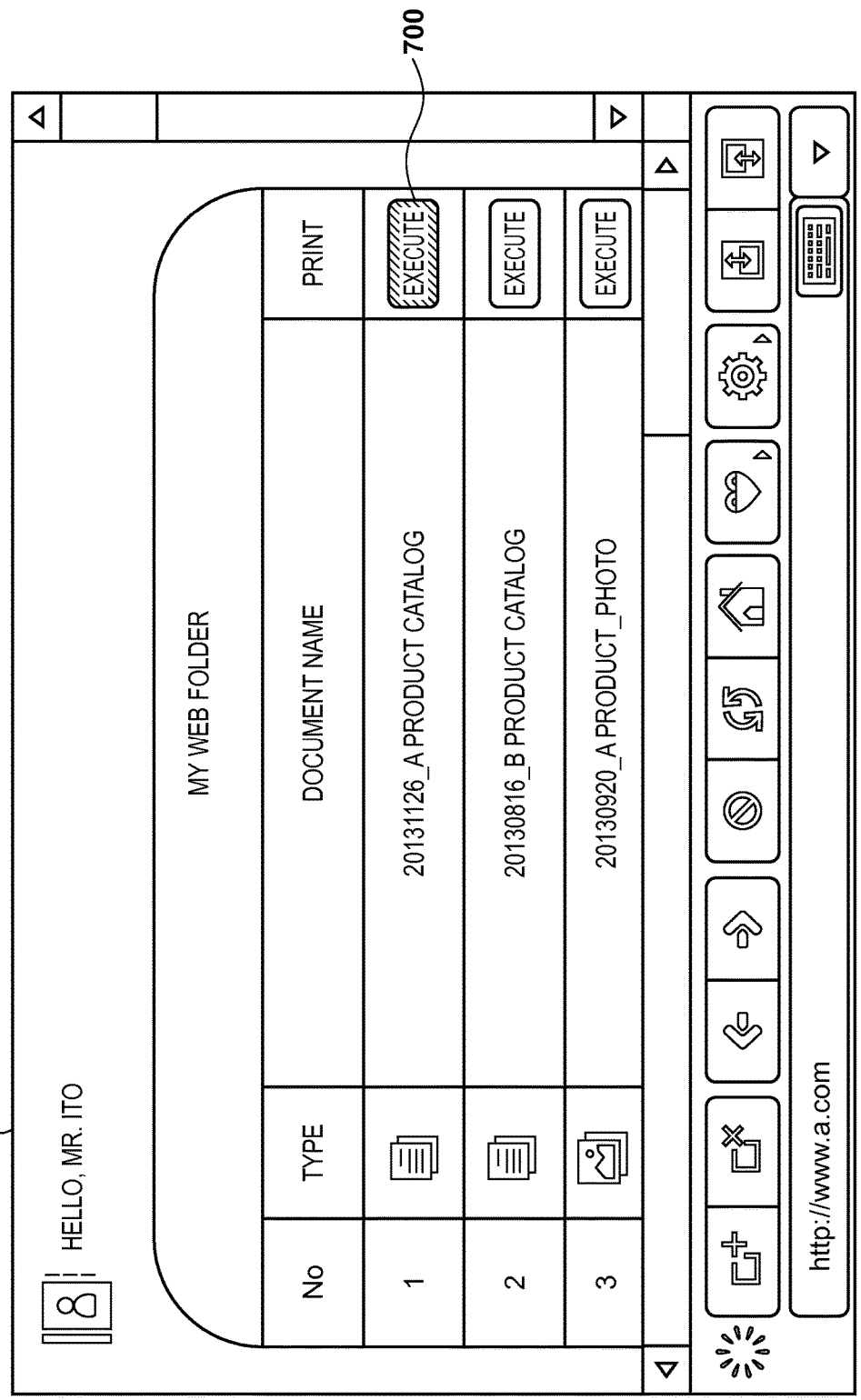
FIG. 7 is a diagram showing an example of a screen displayed by the Web application according to the embodiment.

FIG. 7 is a diagram showing an example of a screen displayed by the Web application 104 according to the embodiment.

The information processing apparatus 101 can obtain the Web application 104 on the Web server 103 through the network 102 to display the screen shown in FIG. 7 with a Web browser of the user interface unit 201.

For example, a user folder on the server can be displayed in FIG. 7. In this state, the user 100 uses the screen to check documents in the folder of the user 100 and presses an execution button 700 corresponding to the document to be printed. When the execution button 700 is pressed, the Web application 104 calls the print service provided by the print service providing module 302 according to the sequence of FIG. 5, and the displayed screen is shifted from FIG. 7 to FIG. 8.

Figure 8:
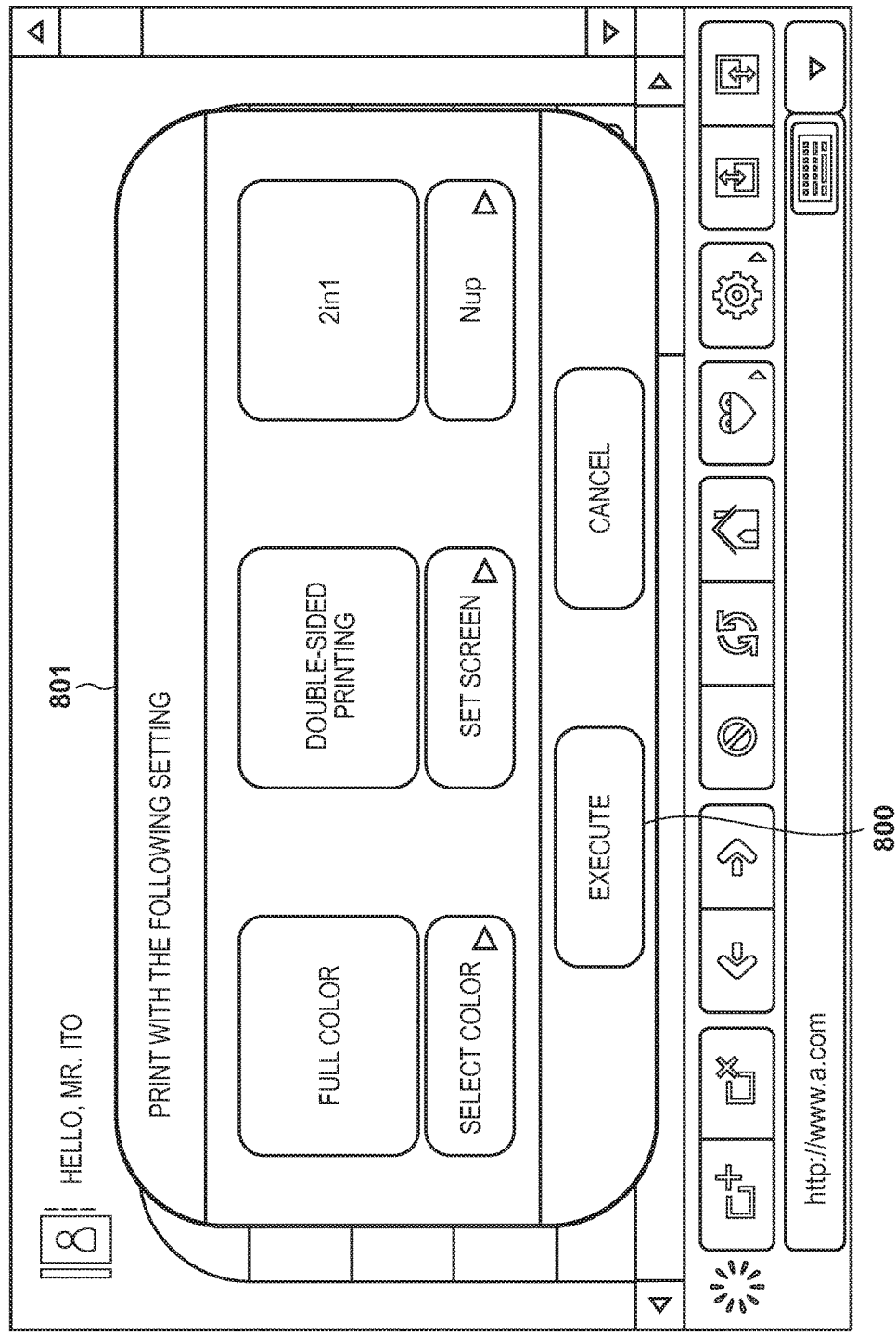
FIG. 8 is a diagram showing an example of a screen displayed by the print service providing module according to the embodiment.

FIG. 8 is a diagram showing an example of a screen displayed by the print service providing module 302 according to the embodiment.

The print service providing module 302 of the information processing apparatus 101 can display a pop-up of a print setting screen 801 for executing a print process as shown in FIG. 8, on the user interface unit 201 according to a command from the OSGi 304. In this state, the user 100 uses the screen to check the print setting and presses an execution button 800. When the execution button 800 is pressed, the print service providing module 302 controls the printer unit 205 and the finisher unit 206, and the print process according to the print setting that is set on the screen can be executed.

As described, according to the present embodiment, a plurality of software platforms can be included, and programs executed on the software platforms can cooperate without a barrier to provide services desired by the user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122745, filed Jun. 13, 2014, which is hereby incorporated by reference herein in its entirety.

What is claimed is:

1. An information processing apparatus including a plurality of software platforms, the apparatus comprising:
   one or more processors; and
   at least one memory coupled to the one or more processors, the at least one memory having stored thereon instructions which, when executed by the one or more processors, cause the information processing apparatus to:
      transform service information provided by first software for operating on a first software platform of the plurality of software platforms into information that is able to be used by a second software platform of the plurality of software platforms, and register the information, and
      transform the transformed and registered information, which second software for operating on the second software platform calls, into the service information provided by the first software, and cause the first software to provide a service corresponding to the service information.

2. The information processing apparatus according to claim 1, wherein the at least one memory includes:
   a transforming data table for associating and registering service information provided by the first software for operating on the first software platform and information that can be used by the second software for operating on the second software platform, and
   further instructions which, when executed by the one or more processors, cause the information processing apparatus to refer to the transforming data table to transform the information requested by the second software into the service information provided by the first software.

3. The information processing apparatus according to claim 2, wherein the at least one memory has stored thereon further instructions which, when executed by the one or more processors, cause the information processing apparatus to detect registration of the service information provided by the first software for operating on the first software platform to thereby register the service information in the transforming data table.

4. The information processing apparatus according to claim 1, wherein the first software platform is a platform for executing a Java application, and the second software platform is a platform for executing a Web application.

5. The information processing apparatus according to claim 4, wherein the at least one memory has stored thereon further instructions which, when executed by the one or more processors, cause the information processing apparatus to transform a name that can be handled by the Java application into a URL that can be handled by the Web application.

6. An information processing apparatus including a plurality of software platforms, the apparatus comprising:
   one or more processors; and
   at least one memory coupled to the one or more processors, the at least one memory having stored thereon instructions which, when executed by the one or more processors cause the information processing apparatus to:
      register and manage service information provided by software for operating on a first software platform of the plurality of software platforms,
      transform the registered service information into transformed information that can be handled by a second software platform of the plurality of software platforms,
      associate and register the registered service information and the transformed information, and
      register and manage the transformed information in the second software platform,
   wherein in response to a call of a service from software for operating on the second software platform, the registered service information is obtained, and
   service information corresponding to information to activate corresponding software for operating on the first software platform is obtained.

7. The information processing apparatus according to claim 6, wherein the first software platform is a platform for executing a Java application, and the second software platform is a platform for executing a Web application.

8. A method of controlling an information processing apparatus having one or more processors and at least one memory coupled to the one or more processors, the information processing apparatus including a plurality of software platforms, the method comprising:
   transforming, by the one or more processors, service information provided by first software for operating on a first software platform of the plurality of software platforms into information that is able to be used by a second software platform of the plurality of software platforms and registering the information; and
   transforming, by the one or more processors, the information transformed and registered in the transforming, which second software for operating on the second software platform calls, into the service information provided by the first software, and causing the first software to provide a service corresponding to the service information.

9. A non-transitory computer-readable storage medium storing a program for causing a computer to function as the information processing apparatus according to claim 1.

* * * * *